(12) United States Patent
Marce et al.

(10) Patent No.: US 7,620,039 B2
(45) Date of Patent: Nov. 17, 2009

(54) DEVICE FOR USE IN A COMMUNICATION NETWORK ROUTER TO SELECT ROUTING INFORMATION

(75) Inventors: Olivier Marce, Massy (FR); Thomas Levy, Paris (FR)

(73) Assignee: Alcatel, Paris (FR)

( * ) Notice: Subject to any disclaimer, the term of this patent is extended or adjusted under 35 U.S.C. 154(b) by 507 days.

(21) Appl. No.: 11/269,738

(22) Filed: Nov. 9, 2005

(65) Prior Publication Data

US 2006/0098658 A1 May 11, 2006

(30) Foreign Application Priority Data

Nov. 10, 2004 (FR) .................................. 04 52597

(51) Int. Cl.
  H04L 12/50 (2006.01)
  H04L 12/28 (2006.01)
  G06F 15/173 (2006.01)
(52) U.S. Cl. .................. 370/380; 370/401; 709/242
(58) Field of Classification Search ......... 370/380–383, 370/389, 392, 400, 401; 709/242
See application file for complete search history.

(56) References Cited

U.S. PATENT DOCUMENTS

| | | | |
|---|---|---|---|
| 6,671,256 B1 * | 12/2003 | Xiong et al. ................ 370/230 |
| 6,700,874 B1 * | 3/2004 | Takihiro et al. ............. 370/248 |
| 6,801,525 B1 * | 10/2004 | Bodnar et al. ............... 370/352 |
| 7,209,449 B2 * | 4/2007 | Tang et al. .................. 370/238 |
| 7,362,700 B2 * | 4/2008 | Frick et al. .................. 370/219 |
| 7,388,840 B2 * | 6/2008 | Deval et al. ................. 370/237 |
| 2003/0023701 A1 | 1/2003 | Norman |
| 2003/0185226 A1 * | 10/2003 | Tang et al. .................. 370/428 |
| 2003/0235195 A1 * | 12/2003 | Shenoy et al. ............... 370/389 |
| 2004/0006640 A1 | 1/2004 | Inderieden |

\* cited by examiner

*Primary Examiner*—Hong Cho
(74) *Attorney, Agent, or Firm*—Sughrue Mion, PLLC

(57) ABSTRACT

A routing information management device for a router of a communication network comprises a first routing information base fed with routing information contained in routing protocol messages, a second forwarding information base having a maximum number of entries, and management means that compare at selected times the number of entries in the first routing information base relating to sending to a selected threshold less than or equal to the maximum number of entries in the second forwarding information base so as to feed the second forwarding information base with routing information selected as a function of the result of the comparison.

17 Claims, 1 Drawing Sheet

DEVICE FOR USE IN A COMMUNICATION NETWORK ROUTER TO SELECT ROUTING INFORMATION

CROSS-REFERENCE TO RELATED APPLICATIONS

This application is based on French Patent Application No. 0452597 filed Oct. 11, 2004, the disclosure of which is hereby incorporated by reference thereto in its entirety, and the priority of which is hereby claimed under 35 U.S.C. § 119.

BACKGROUND OF THE INVENTION

1. Field of the Invention

The invention relates to routers used in communication networks to route data packets (also known as datagrams) between sources and destinations.

2. Description of the Prior Art

The person skilled in the art knows that a router needs routing information to be able to send over one of its interfaces packets (also known as datagrams) that it has received over another of its interfaces. This information is generally stored in two databases in the router: a routing information base (RIB) that is fed with routing information contained in routing protocol messages exchanged by the routers of the networks, and a forwarding information base (FIB) that is fed with routing information stored in the routing information base by a routing tool (also known as a routing engine) of the router.

Routing protocols commonly used include the Border Gateway Protocol (BGP) and the Open Shortest Path First (OSPF) protocol.

Because the forwarding information base (FIB) has a maximum number of entries that is usually less than the maximum number of entries relating to sending in the routing information base (RIB), it is sometimes saturated, which can prevent the router from functioning in certain situations.

In the present context, the term "entry" means a storage location dedicated to an item of information in a database taking the form of a table of correspondences.

In an attempt to overcome this problem, it has been proposed to equip routers with a management device responsible for monitoring the status of the forwarding information base (FIB) in terms of how full it is, in order to stop feeding it with routing information coming from the routing information base just before it becomes saturated. In the case of BGP routers, it has also been proposed to limit the number of prefixes (or addresses) received by each router.

In either case, if the forwarding information base (FIB) is saturated and feeding it has been stopped, it may not contain definitions of all the routes, known as primary routes, that enable its router to provide complete connectivity vis à vis the addresses (or prefixes) that it knows, although it does contain definitions of routes, known as secondary routes, for providing additional services, such as a traffic distribution service (also known as "load balancing") and a redundancy service, that are not directly related to connectivity.

Consequently, in the event of saturation of its second forwarding information base (FIB), the router cannot provide complete connectivity. In other words, the two solutions that have been proposed suffer from a lack of discrimination between routes defined by routing information stored in the first routing information base (RIB).

Moreover, in the event of a large change in the first routing information base (RIB), updating the second forwarding information base (FIB) with all the entries from the RIB, with no distinction between primary and secondary entries, can take some time, during which the router is not available to forward packets that it receives; this is incompatible with the continuity of service expected of an IP network.

Because no prior art solution proves to be entirely satisfactory, one object of the invention is to improve on this situation.

SUMMARY OF THE INVENTION

To this end it proposes a routing information management device for a router of a communication network, the device comprising a first routing information base adapted to be fed with routing information contained in routing protocol messages, a second forwarding information base having a maximum number of entries, and management means adapted to feed the second forwarding information base with routing information coming from the first routing information base, in which device the management means compare at selected times the number of entries in the first routing information base relating to sending to a selected threshold less than or equal to the maximum number of entries in the second forwarding information base so as to feed the second forwarding information base with routing information selected as a function of the result of the comparison.

The device of the invention may have other features, and in particular, separately or in combination:

- if the number of entries in the first routing information base relating to sending is greater than or equal to the selected threshold its management means can feed the second forwarding information base with "primary" routing information representing only primary routes enabling the router to ensure complete connectivity vis à vis addresses (or prefixes) that it knows and if the number of entries in the first routing information base relating to sending is less than the selected threshold the management means can feed the second forwarding information base with the primary routing information and "secondary" routing information;
- the secondary routing information represents secondary routes associated with additional services, for example traffic distribution and redundancy;
- its management means can analyze the routing information stored in the first routing information base to select the primary and/or secondary routing information;
- the first routing information base can be divided into a primary portion and a secondary portion; in this case the device comprises processing means that analyze the routing information contained in the routing protocol messages in order to store the primary routing information in the primary portion and the secondary routing information in the secondary portion;
- if the number of entries of the first routing information base is greater than or equal to the threshold its management means can feed the second forwarding information base with primary routing information stored in the primary portion and if the number of entries in the first routing information base is less than the threshold the management means can feed the second forwarding information base with the primary and secondary routing information respectively stored in the primary portion and the secondary portion;
- the threshold selected is in a range defined by a first value equal to 80% of the maximum number of entries in the second forwarding information base and a second value equal to 95% of the maximum number of entries in the second forwarding information base;

its management means can generate an alarm message intended for a manager of the network each time that the number of entries of the first routing information base relating to sending is greater than or equal to the selected threshold;

its management means can update the second forwarding information base hierarchically, beginning with the primary information, in the event of a large change to the content of the first routing information base;

the routing information is supplied by routing protocol messages selected in a group including BGP and OSPF protocol messages, for example.

The invention also proposes a router equipped with a management device of the above type.

The invention is particularly well suited, although not exclusively so, to Internet Protocol (IP) communication networks, and more generally to any type of packet transmission communication network.

BRIEF DESCRIPTION OF THE DRAWING

Other features and advantages of the invention will become apparent on reading the following detailed description and examining the appended drawing, in which the single FIGURE is a highly diagrammatic representation of a router equipped with one embodiment of a management device of the invention. The appended drawing constitutes part of the description of the invention as well as contributing to the definition of the invention, if necessary.

DETAILED DESCRIPTION OF THE PREFERRED EMBODIMENT

Figure 1:
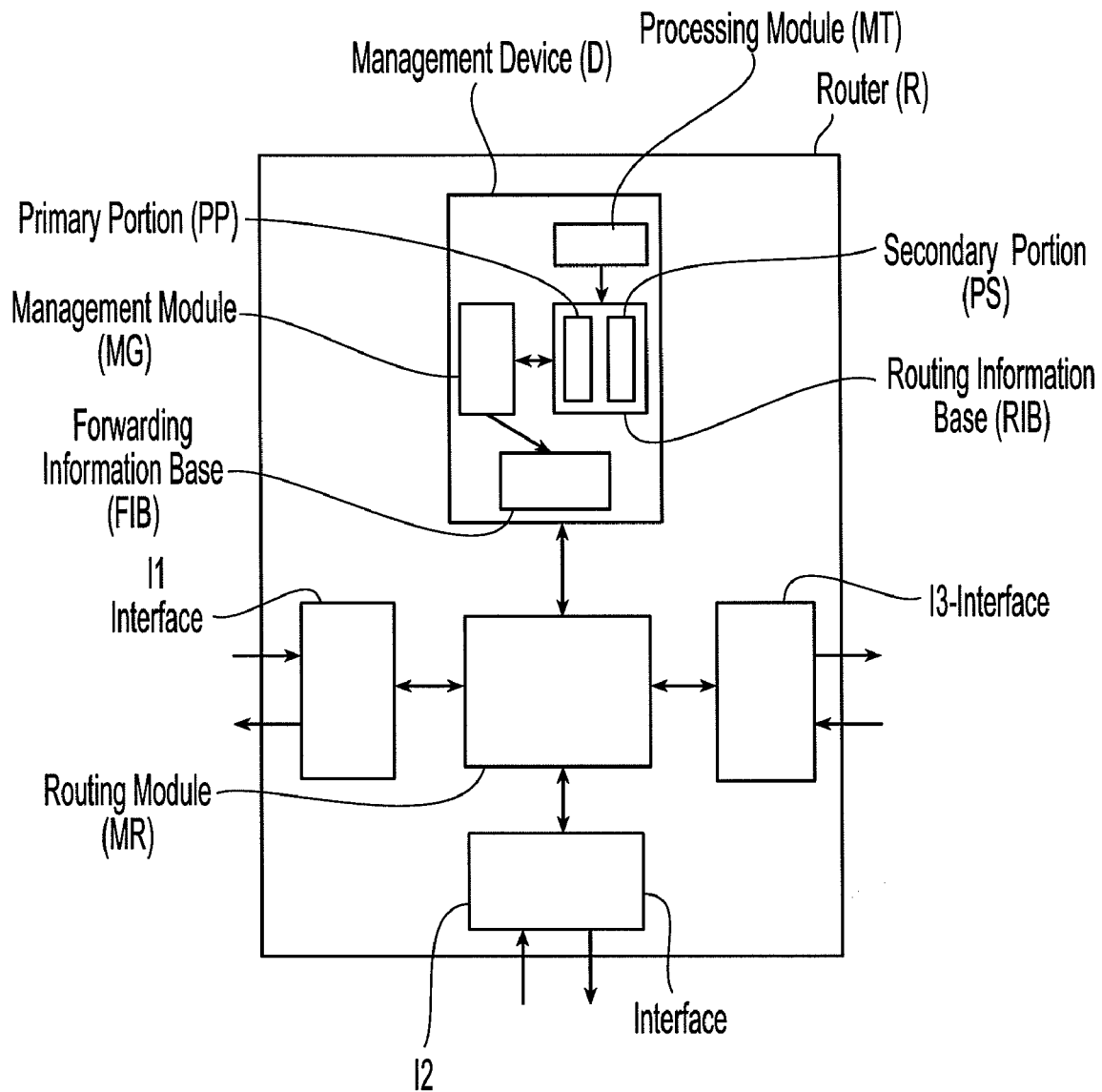

The invention has the object of enabling a router of a communication network to offer complete connectivity vis à vis addresses (or prefixes) that it knows, in particular if there is a risk of its forwarding information base (FIB) becoming saturated.

An Internet Protocol (IP) communication network including the router of the invention is considered hereinafter by way of non-limiting example. The invention is not limited to that type of network, however. It concerns any type of network in which data packets (also known as datagrams) coming from a source communication equipment must be routed to one or more destination communication equipments.

Broadly speaking, but nevertheless in sufficient detail for the invention to be understood, a router R may be summarized as comprising input/output interfaces II connected to communication channels (or links), which are represented by arrows in the single figure, and to a routing module MR.

In the present nonlimiting example, the value of the suffix i is from 1 to 3, but it may take any other value.

The routing module MR comprises a switching matrix connected to the interfaces II of its router R, which it has to configure as a function of instructions supplied by the network, address information contained in the data packets (also known as datagrams) to be sent or forwarded, and routing information contained in a forwarding information base (FIB), to enable the forwarding and routing of said data packets to one or more destinations. It generally further comprises (or is connected to) memories enabling local adding and/or dropping of data packets and temporary storage of data packets received over one of the interfaces II.

The routing module MR is not described in more detail here because it is well known to the person skilled in the art and does not constitute the subject matter of the invention.

The routing information used by the routing module MR is managed by a management device D that is preferably installed in the router R and coupled to its routing module MR. The device D could equally take the form of a separate unit connected to the router R.

The management device D of the invention comprises a routing information base RIB, a forwarding information base FIB and a management module MG.

The routing information base RIB is fed with routing information extracted from routing protocol messages, for example BGP or OSPF messages, that the routers R of communication networks conventionally exchange. The routing information base RIB generally includes a very large number of entries each storing one item of routing information relating to one known address (or prefix). Some of this information relates to forwarding.

The forwarding information base FIB essentially contains forwarding information that is useful to the routing module MR and is extracted from the routing information base RIB by the management module MG, which to this end implements the routing tool (or engine) function. The forwarding information base FIB contains a maximum number Nmax of entries each storing one item of forwarding information relating to a known address (or prefix).

To be more precise, at selected times the management module MG compares the number of entries in the routing information base RIB that relate to forwarding to a selected threshold S that is less than or equal to the maximum number Nmax of entries in the forwarding information base FIB, in order to feed the latter with routing information (dedicated to sending) selected as a function of the comparison result.

The comparisons may be effected periodically, for example, at intervals of one minute, for example. However, they may equally be effected when triggered on the receipt of instructions from the network administrator (or manager), or if a particular condition is satisfied in the router, for example a frequent change of route destinations.

Two types of routing information are preferably defined.

A first (or primary) type includes routing information that represents only routes known as primary routes that enable the router R to provide maximum connectivity vis à vis addresses (or prefixes) that it knows. This maximum connectivity is defined as all of the routing information that enables all the addresses for which the router has received an item of routing information to be reached, but without necessarily taking account of the specifics of each address. For example, if a route R1 is defined to reach an address A1 and a route A2 enables the addresses A1 and A2 to be reached at the same time, then the route R2 is called a primary route.

A second (or secondary) type includes all the other routing information, which might be described as complementary information and generally consists of information representing routes known as secondary routes that are associated with additional services that include, for example, a traffic distribution service (also known as "load balancing"), which distributes the traffic (or the load) over different route portions having the same destination, and a redundancy service, which enables an identical second primary route to take over from a first primary route if a problem arises on the first primary route, and vice versa. In the above example, the route R1 is called a secondary route because it is used to provide the additional information on how to reach the address A1, although that address A1 can already be reached via the route R2.

This secondary information is useful to the router R, in particular for providing a service defined by a service level agreement (SLA) between a network operator and one of its customers. This enriches the possibilities offered to a router R to reach a destination defined by an address (or prefix) that it knows. However, it is not necessary to said router R to provide complete connectivity vis à vis said addresses (or prefixes) that it knows.

The management module MG is preferably responsible for feeding the forwarding information base FIB with primary routing information (relating to sending) each time that the result of a comparison indicates that the number of entries in the routing information base RIB, relating to sending, is greater than or equal to the selected threshold S (less than or equal to the maximum number Nmax of entries in the forwarding information base FIB), while it is preferably responsible for feeding the forwarding information base FIB with all of the primary and secondary routing information (relating to sending) each time that the result of a comparison indicates that the number of entries in the routing information base RIB, relating to sending, is below the selected threshold S.

The threshold S may take any value less than or equal to the maximum number Nmax of entries in the forwarding information base FIB. However, it is preferable for it to be in a range defined by a first value equal to 80% of the maximum number Nmax of entries in the forwarding information base FIB and a second value equal to 95% of said maximum number of entries in the forwarding information base FIB. A threshold S equal to 90% of the maximum number Nmax of entries in the forwarding information base is selected, for example.

The management module MG can discriminate between primary and secondary information in two or more ways.

One way is to use a conventional routing information base RIB and to adapt the management module MG so that it is capable of analyzing the type of routing information stored in the routing information base RIB, in order to select either only the primary routing information (relating to sending), or all of the primary and secondary routing information (relating to sending).

A second way, shown in the single figure, is to use a routing information base RIB divided into a primary portion PP storing primary routing information and a secondary portion PS storing secondary routing information.

In this case, the management device D preferably comprises a processing module MT responsible for analyzing the type of routing information that is contained in received routing protocol messages in order to discriminate those of primary type from those of secondary type. The processing module MT is also responsible for storing the primary routing information that it has discriminated in the primary portion PP of the routing information base RIB and the secondary routing information that it has discriminated in the secondary portion PS of said routing information base RIB.

Thus the management module MG does not need to analyze the type of routing information stored in the routing information base RIB. It now suffices for it either to extract from the first portion PP of the routing information base RIB the primary information (relating to sending) that it stores to feed the forwarding information base FIB, if the number of entries (relating to sending) in the routing information base RIB is greater than or equal to the selected threshold S, or to extract from the first portion PP and the second portion PS of the routing information base RIB the primary and secondary information (relating to sending) that they respectively store to feed the forwarding information base FIB, if the number of entries (relating to sending) in the routing information base RIB is less than the selected threshold S.

The management module MB may further generate an alarm message addressed to the network manager each time that the number of entries in the routing information base RIB, relating to sending, is greater than or equal to the selected threshold S, and therefore each time that it decides to feed the forwarding information base FIB only with primary routing information. The network manager being warned in this way of the situation of one of its routers, it can react accordingly.

The management module MG may also, in the event of a large and sudden change in the content of the routing information base RIB, effect a hierarchical updating of the forwarding information base FIB by first feeding it with primary routing information to reduce the delay applying to said update to that which is strictly necessary and then adding the secondary routing information to the forwarding information base FIB, for example by spreading these updates over a longer time period.

The management device D of the invention, and in particular its management module MG and its processing module MT, where applicable, may take the form of electronic circuits, software (or electronic data processing) modules, or a combination of circuits and software.

The invention is not limited to the management device and router embodiments described hereinabove by way of example only, and encompasses all variants that the person skilled in the art might envisage that fall within the scope of the following claims.

There is claimed:

1. A routing information management device for a router of a communication network, said device comprising a first routing information base adapted to be fed with routing information contained in routing protocol messages, a second forwarding information base having a maximum number of entries, and management means adapted to feed said second forwarding information base with routing information coming from said first routing information base, in which device said management means compares, at selected times, the number of entries in said first routing information base relating to forwarding, to a selected threshold less than or equal to said maximum number of entries in said second forwarding information base so as to feed said second forwarding information base with routing information selected as a function of the result of said comparison, wherein, if said number of entries in said first routing information base relating to forwarding is greater than or equal to said selected threshold, said management means feeds said second forwarding information base with "primary" routing information representing only primary routes enabling said router to ensure complete connectivity vis à vis addresses that it knows and if said number of entries in said first routing information base relating to sending is less than said selected threshold, said management means feeds said second forwarding information base with said primary routing information and "secondary" routing information.

2. The device according to claim 1, wherein said secondary routing information represents secondary routes associated with additional services.

3. The device according to claim 2, wherein said additional services are selected from a group including traffic distribution and redundancy.

4. The device according to claim 3, wherein said management means analyze said routing information stored in said first routing information base to select said primary and/or secondary routing information.

5. The device claimed in claim 3, wherein said first routing information base is divided into a primary portion and a secondary portion and said device comprises processing means that analyze said routing information contained in said routing protocol messages in order to store said primary routing information in said primary portion and said secondary routing information in said secondary portion.

6. The device according to claim 2, wherein said management means analyze said routing information stored in said first routing information base to select said primary and/or secondary routing information.

7. The device claimed in claim 2, wherein said first routing information base is divided into a primary portion and a secondary portion and said device comprises processing means that analyze said routing information contained in said routing protocol messages in order to store said primary routing information in said primary portion and said secondary routing information in said secondary portion.

8. The device according to claim 2, wherein said threshold is in a range defined by a first value equal to 80% of said maximum number of entries and a second value equal to 95% of said maximum number of entries.

9. The device according to claim 1, wherein said management means analyze said routing information stored in said first routing information base to select the primary and/or secondary routing information.

10. Amended The device claimed in claim 1, wherein said first routing information base is divided into a primary portion and a secondary portion and said device comprises processing means that analyze said routing information contained in said routing protocol messages in order to store said primary routing information in said primary portion and said secondary routing information in said secondary portion.

11. The device according to claim 1, wherein said first routing information base is divided into a primary portion and a secondary portion and said device comprises processing means that analyze said routing information contained in said routing protocol messages in order to store said primary routing information in said primary portion and said secondary routing information in said secondary portion; wherein, if said number of entries of said first routing information base is greater than or equal to said threshold said management means feed said second forwarding information base with primary routing information stored in said primary portion and if said number of entries in said first routing information base is less than said threshold said management means feed said second forwarding information base with said primary and secondary routing information respectively stored in said primary portion and said secondary portion.

12. The device according to claim 1 wherein said threshold is in a range defined by a first value being equal to 80% of said maximum number of entries and a second value equal to 95% of said maximum number of entries.

13. The device according to claim 1, wherein said threshold is in a range defined by a first value equal to 80% of said maximum number of entries and a second value equal to 95% of said maximum number of entries.

14. The device according to claim 1, wherein said management means generate an alarm message intended for a manager of said network each time that said number of entries of said first routing information base relating to forwarding is greater than or equal to said selected threshold.

15. The device according to claim 1, wherein said management means updates said second forwarding information base hierarchically, beginning with said primary information, in the event of a change to the content of said first routing information base.

16. The device according to claim 1, wherein said routing information is supplied by routing protocol messages selected from a group including BGP and OSPF protocol messages.

17. A router for a communication network comprising a management device according to claim 1.

* * * * *

UNITED STATES PATENT AND TRADEMARK OFFICE
CERTIFICATE OF CORRECTION

PATENT NO.       : 7,620,039 B2
APPLICATION NO.  : 11/269738
DATED            : November 17, 2009
INVENTOR(S)      : Marce et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Twenty-sixth Day of October, 2010

David J. Kappos
*Director of the United States Patent and Trademark Office*